US007945431B1

(12) United States Patent
Mukherjee et al.

(10) Patent No.: US 7,945,431 B1
(45) Date of Patent: *May 17, 2011

(54) TRANSLATING MATES IN GEOMETRIC MODELS INTO JOINT BLOCKS IN BLOCK DIAGRAM MODELS

(75) Inventors: Arnav Mukherjee, Newton, MA (US); Jeff Wendlandt, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 566 days.

This patent is subject to a terminal disclaimer.

(21) Appl. No.: 12/008,586

(22) Filed: Jan. 11, 2008

Related U.S. Application Data

(63) Continuation of application No. 10/745,017, filed on Dec. 22, 2003, now Pat. No. 7,319,941.

(51) Int. Cl.
*G06F 17/50* (2006.01)

(52) U.S. Cl. .............. 703/2; 703/1; 703/6; 345/419; 345/424; 345/594

(58) Field of Classification Search .............. 710/73; 703/7, 6, 1; 700/159, 98, 30, 2; 345/419, 345/424, 594
See application file for complete search history.

(56) References Cited

U.S. PATENT DOCUMENTS

| 5,146,566 | A | 9/1992 | Hollis, Jr. et al. |
| 5,625,575 | A | 4/1997 | Goyal et al. |
| 5,691,909 | A | 11/1997 | Frey et al. |
| 2002/0123812 | A1 | 9/2002 | Jayaram et al. |

OTHER PUBLICATIONS

Bunus et al., Modelica, Mechanical Models Translation, Simulation and Visualization in Modelica, Modelica Workshop 2000 Proceeding, pp. 199-208.*
Taewoo Kim, A 3D XML-Based Modeling and Simulation Framework for Dynamic Models, May 2002.*
Dynasim AB, Dymola, Dynamic Modeling Laboratory, User's Manual, 2002.*
Sinha et al., Integration of Mechanical CAD and Behavioral Modeling, IEEE 2000, 0-7695-0893-6/00.*
Bunus, Peter et al., "Mechanical Models Translation, Simulation and Visualization in Modelica," *Modelica Workshop 2000 Proceedings*, pp. 199-208 (2000).
Dymola, "Dynamic Modeling Laboratory, User's Manual, version 5.0," Dynasim AB (1992-2002).
Mattsson, Sven Erik et al., "Dynamic Selection of States in Dymola," *Modelica Workshop 2000 Proceedings*, pp. 61-67 (2000).
Sinha, Rajarishi et al., "Integration of Mechanical CAD and Behavioral Modeling," *IEEE/ACM International Workshop on Behavioral Modeling and Simulation*, pp. 31-36 (2000).

* cited by examiner

*Primary Examiner* — David Silver
*Assistant Examiner* — Cuong V Luu
(74) *Attorney, Agent, or Firm* — Nelson Mullins Riley & Scarborough LLP; Kevin J. Canning; Neslihan I. Doran

(57) ABSTRACT

Methods and systems for translating models generated in one modeling environment into models that can be used in other modeling environments. In particular, information regarding a relationship between components of models in one modeling environment is translated into corresponding elements of models in other modeling environments. In some embodiments of the present invention, for example, mate information between rigid parts in geometric models may be translated into corresponding elements in other modeling environments. The mate information between parts in geometric models may be translated into information representing the degrees of freedom (DoFs) of the parts in the geometric models. The information on the DoFs of the parts in the geometric models may be utilized to build up corresponding elements in other modeling environments that represent the relationship between the parts of the geometric models.

18 Claims, 14 Drawing Sheets

|  | Point | Line | Plane | Cylinder | Cone |
|---|---|---|---|---|---|
| Point | ③ | -2 | 1 | -2 | 9 |
| Line | -2 | ⟨-2⟩ | 1 | -2 | 9 |
| Plane | 1 | 1 | ① | 9 | 9 |
| Cylinder | -2 | -2 | 9 | 9 | 9 |
| Cone | 9 | 9 | 9 | 9 | 9 |

910 — Point row label; 920 — Line row label; 930 — callout

*Fig. 9A*

|  | Point | Line | Plane | Cylinder | Cone |
|---|---|---|---|---|---|
| Point | ⓪ | 11 | 11 | 11 | 9 |
| Line | 11 | ⟨-2⟩ | -1 | 11 | 9 |
| Plane | 11 | -1 | ⟨-2⟩ | 9 | 9 |
| Cylinder | 11 | 11 | 9 | 9 | 9 |
| Cone | 9 | 9 | 9 | 9 | 9 |

940 — Point row label; 950 — Line row label; 960 — callout

*Fig. 9B*

```xml
<?xml version="1.0" ?>
- <PhysicalModelingXMLFile>
    <formatVersion>"1.0"</formatVersion>
    <creationDate>"03/18/03||11:08:05"</creationDate>
    <createdBy>""</createdBy>
    <modelName>"robot"</modelName>
    <subsystem>
    - <Subsystem>
        <name>"robot"</name>
        <status>""</status>
        <bodies>
          + <Body>
          + <Body>
          + <Body>
          + <Body>
        </bodies>
        <joints>
          + <SimpleJoint>
          + <SimpleJoint>
          + <SimpleJoint>
          + <SimpleJoint>
          + <SimpleJoint>
          + <SimpleJoint>
        </joints>
        <grounds>
          + <Ground>
        </grounds>
        <subsystems>
          + <Subsystem>
        </subsystems>
        </connectionPorts />
        <id>0</id>
      </Subsystem>
    </subsystem>
</PhysicalModelingXMLFile>
```

*Fig. 12*

TRANSLATING MATES IN GEOMETRIC MODELS INTO JOINT BLOCKS IN BLOCK DIAGRAM MODELS

RELATED APPLICATION

This patent application is a continuation application of, and claims the benefit of, U.S. patent application Ser. No. 10/745,017 filed on Dec. 22, 2003, entitled "Translating Mates In Geometric Models Into Joint Blocks In Block Diagram Models".

FIELD OF THE INVENTION

The present invention relates generally to graphical modeling environments and more particularly to methods and systems for translating mates in geometric modeling environments into joint blocks in block diagram modeling environments.

BACKGROUND OF THE INVENTION

Various classes of block diagrams describe computations that can be performed on application specific computational hardware, such as a computer, microcontroller, FPGA, and custom hardware. Classes of such block diagrams include time-based block diagrams, such as those found within Simulink®, from The MathWorks, Inc. of Natick, Mass., state-based and flow diagrams, such as those found within Stateflow®, from The MathWorks, Inc. of Natick, Mass., and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages, such as Simulink®. Such packages provide sophisticated software platforms with a rich suite of support tools that makes the analysis and design of dynamic systems efficient, methodical, and cost-effective.

Geometric modeling environments, such as Computer-aided design (CAD) environments, enable users to model machines geometrically into assemblies. Although the geometric modeling environments are useful for the physical modeling of machines, it is difficult to design control systems that can be incorporated into the geometric model of the machines. The block diagram modeling environments, such as Simulink®, use a schematic approach to model control systems around mechanical devices and simulate the dynamics of the mechanical devices with the control systems. Therefore, it is desired to translate models generated in geometric modeling environments into models that can be utilized in block diagram modeling environments.

SUMMARY OF THE INVENTION

The present invention provides methods and systems for translating models generated in one modeling environment into models that can be used in other modeling environments. In other words, the present invention introduces models generated in different modeling environments into a modeling environment in which users want to use the models. In particular, the present invention translates information regarding a relationship between components of models in one modeling environment into corresponding elements of models in other modeling environments. In some embodiments of the present invention, for example, mate information between rigid parts in geometric models may be translated into corresponding elements in other modeling environments. The mate information between parts in geometric models may be translated into information representing the degrees of freedom (DoFs) of the parts in the geometric models. The information on the DoFs of the parts in the geometric models may be utilized to build up corresponding elements in other modeling environments.

In one aspect of the present invention, a method is provided for translating information on the relationship between parts in geometric models into corresponding elements in a block diagram modeling environment. Information on the relationship between parts in geometric models is extracted from the geometric models. The extracted information is translated into corresponding elements in a block diagram modeling environment. The corresponding elements incorporate information on the DoFs of the parts in the geometric models.

In another aspect of the present invention, a method is provided for translating mate information between parts in geometric models into a neutral data format. A mapping matrix is provided for mates in a geometric modeling environment. The mapping matrix includes mapping data that represents the DoFs lost for the mates. The mate information is translated into information on the DoFs of the parts in the geometric models based on the mapping data included in the mapping matrix. The information on the DoFs of the parts in the geometric models is stored in a neutral data format.

In still another aspect of the present invention, a medium is provided that holds mapping data for translating mate information in a geometric modeling environment into corresponding components in other modeling environments. The mapping data is included in a matrix format that includes columns for representing types of one part relating to a mate and rows for representing types of the other part relating to the mate. The columns and rows cross at cross sections in which mapping data is stored for the types of parts represented by the crossing columns and rows. The mapping data represents the DoFs of the parts in the geometric model lost for the mate.

By translating models created in geometric modeling environments into models in block diagram modeling environments, the present invention enables users to efficiently design control systems for the models created in the geometric modeling environments. Additionally, the models created in the geometric modeling environments can be dynamically simulated in the block diagram modeling environments.

BRIEF DESCRIPTION OF THE DRAWINGS

The aforementioned features and advantages, and other features and aspects of the present invention, will become better understood with regard to the following description and accompanying drawings, wherein:

FIGS. 9A and 9B illustrate the mate map data contained in the first page of the mate map matrices shown in FIGS. 8A and 8B, respectively.

FIG. 12 shows an exemplary XML file provided in the illustrative embodiment of the present invention.

DETAILED DESCRIPTION

Figure 1:
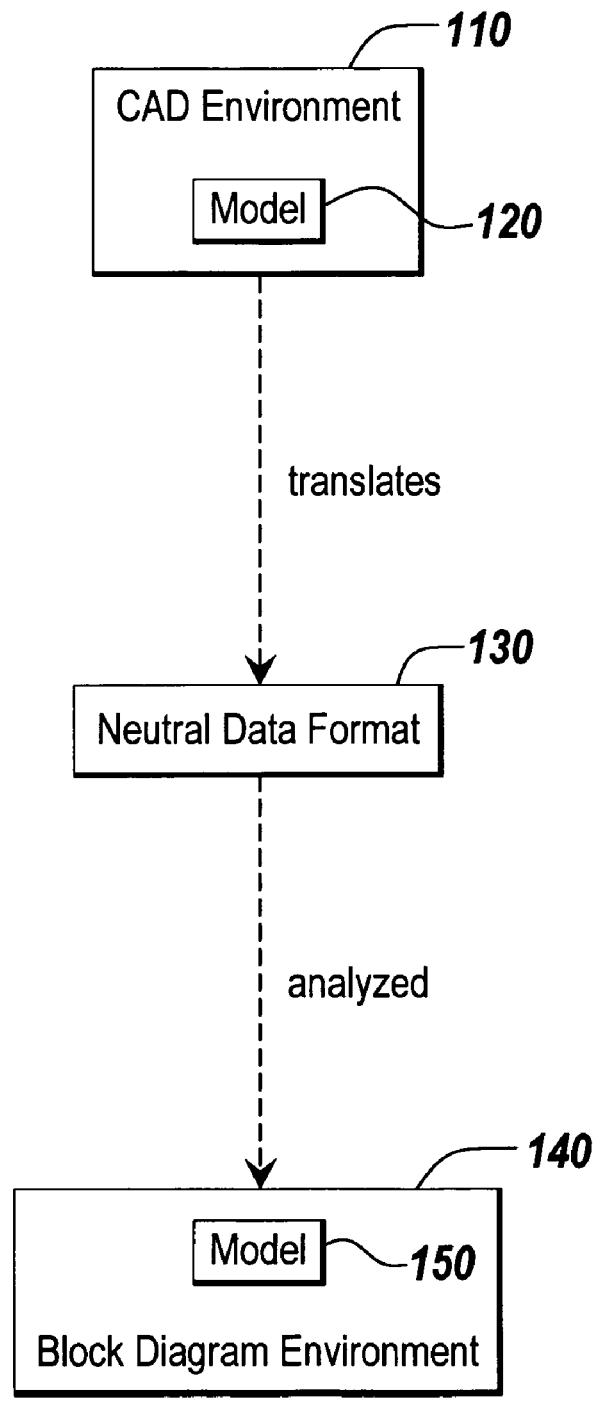
FIG. 1 depicts an illustrative embodiment of the present invention in which a model generated in a CAD environment is translated into a block diagram model in a block diagram modeling environment.

The illustrative embodiment of the present invention concerns the translation of models created in Computer Aided Design (CAD) environments into models in block diagram modeling environments. CAD environments are widely utilized to design target objects, including mechanical, electrical, and architectural objects. In particular, CAD environments provide useful environments for users to model physical objects, such as machines, into geometric assemblies. The CAD environments may be provided by software tools, such as tools from SolidWorks Corporation of Concord, Mass., and CATIA from Dassault Systèmes of France. Block diagram modeling environments represent real systems as a collection of blocks interconnected by lines. Blocks are entities of models that perform given functions in the models. Exemplary block diagram modeling environments are found in Simulink® and SimMechanics, both from The MathWorks, Inc. of Natick, Mass. Nevertheless, those who skilled in the art will appreciate that the present invention may be practiced in other block diagram modeling environments, including but not limited to LabVIEW from National Instruments Corporation of Austin, Tex.

For illustrative purposes only in the discussion below, the illustrative embodiment will be described relative to an implementation that uses Simulink® and SimMechanics.

"Block diagram" will be used hereinafter as described above in the Background of the Invention.

Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user-interface that allows drafting of block diagram models of the target systems. All of the blocks in a block library provided by Simulink and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor. Using this textual interface, users may write special scripts that perform automatic editing operations on the block diagram. Simulink® also allows users to simulate the designed target systems to determine the behavior of the systems. Simulink® includes a block diagram execution engine that carries out the task of compiling and linking the block diagram to produce an "in-memory executable" version of the model that is used for generating code and/or simulating a block diagram model.

SimMechanics provides tools for modeling mechanical components of physical systems in block diagram modeling environments. SimMechanics provides environments in which users can model and simulate geometric configurations and responses to mechanical stimuli. SimMechanics contains blocks that correspond to physical components, such as bodies, joints, constraints, coordinate systems, actuators, and sensors. The blocks in SimMechanics enable users to model complicated mechanical subsystems found in most physical systems, such as ground vehicles, aircraft, spacecraft, and manufacturing equipment. Within the Simulink® environment, users can use SimMechanics to define and easily modify system's physical parameters, including the position, orientation, and motion of the mechanical components. SimMechanics enables users to design corresponding control systems in Simulink® environment. SimMechanics extends the control design capabilities of Simulink® into the mechanical domain. SimMechanics and Simulink® together provide an integrated environment for modeling multi-domain systems and controllers and evaluating overall system performance, which allows the entire machine/controller system to be modeled in a single environment.

The illustrative embodiment of the present invention translates a model generated in a CAD environment into a model in a block diagram modeling environment. The CAD model may include information on geometric representation of physical objects, which may relate to rigid parts of the CAD model and to mates between the rigid parts. The term 'mate' is generally used to refer to a pair of parts mated to each other. The term 'mate' is also used to refer to a mating condition for mating a pair of parts to each other in the illustrative embodiment of the present invention.

The information on the mates between rigid parts describes how the rigid parts mate to each other and determines how the rigid parts are brought into an assembly. The types of the mates may differ depending on the CAD environments in which the CAD model is created. In the illustrative embodiment, the mate information is translated into information representing the degrees of freedom (DoFs) of the rigid parts in the CAD model. A DoF represents a single coordinate of relative motion between parts. The coordinate is free if it can respond without constraint or imposed motion to externally applied forces or torques. For translational motion, a DoF is linear coordinate along a single direction. For rotational motion, a DoF is an angular coordinate about a single, fixed axis. In the illustrative embodiment, prismatic and revolute joints are primitive joints that represent single translational and rotational DoFs, respectively. In the illustrative embodiment, a spherical joint is a primitive joint that represents three rotational DoFs in angle-axis form and a weld joint represents zero DoFs.

The information on the DoFs of the rigid parts in the CAD model is stored in a neutral data format, which is subsequently imported into a block diagram modeling environment and used to build up corresponding joint blocks between body blocks that represent the rigid parts of the CAD model. In the illustrative embodiment, the joint blocks represent one or more mechanical DoFs that one body has relative to another body. Unlike a physical joint, the joint blocks do not have mass or an inertia tensor. The joint block may be specified by designating the primitives of the joint blocks and the axes of the primitives. SimMechanics provides an extensive joint block library for modeling various types of joints.

One of ordinary skill in the art will appreciate that although the illustrative embodiment is described in connection with models created in CAD environments, the present invention is not limited to the CAD models, but rather applies to models created in other modeling environments including multibody simulation environments, such as ADAMS and VisualNatran 4D, both from MSC.Software Corp. of Santa Ana, Calif. One of ordinary skill in the art will also appreciate that the block diagram modeling environments are also illustrative modeling environments and the DoFs information may be imported into other types of modeling environments.

FIG. 1 depicts an illustrative embodiment of the present invention in which a model generated in a CAD environment is translated into a model in a block diagram modeling environment. A model 120 is created and/or loaded (i.e. loaded from memory) in a CAD environment 110. The model 120 includes geometric representations of physical objects, such as a machine. The model 120 will be described below in more detail for an illustrative example with reference to FIG. 4. The model 120 generated in the CAD environment 110 may not be used in other modeling environments, such as a block diagram modeling environment 140, that require different data formats for models. In order to use the model 120 in other modeling environments, the illustrative embodiment of the present invention translates the model 120 into a neutral data format 130. The neutral data format 130 contains information extracted from the model 120. The neutral data format 130 may include any data format that can be accessed by both of the environments 110 and 140. An exemplary neutral data format 130 may be described using Markup Languages, such as Extensible Markup Language (XML). One of ordinary skill in the ordinary art will appreciate that the neutral data format 130 may be described using other markup languages, such as Hypertext Mark-up Language (HTML) and Standard Generalized Mark-up Language (SGML). Further, the neutral data format need not be a markup language format. For example, the neutral data format could be a text format or other canonical format. The XML file will be described below in more detail with reference to FIG. 12. The neutral data format 130 is imported into another modeling environment, such as block diagram modeling environment 140. The block diagram modeling environment 140 reads and analyzes the neutral data format 130 to generate a block diagram model 150 based on the information contained in the neutral data format 130. One of ordinary skill in the art will appreciate that the CAD environment 110 and block diagram modeling environment 140 are exemplary modeling environments in which the illustrative embodiment of the present invention is practiced and other embodiments may be practiced with models of other modeling environments.

Figure 2:
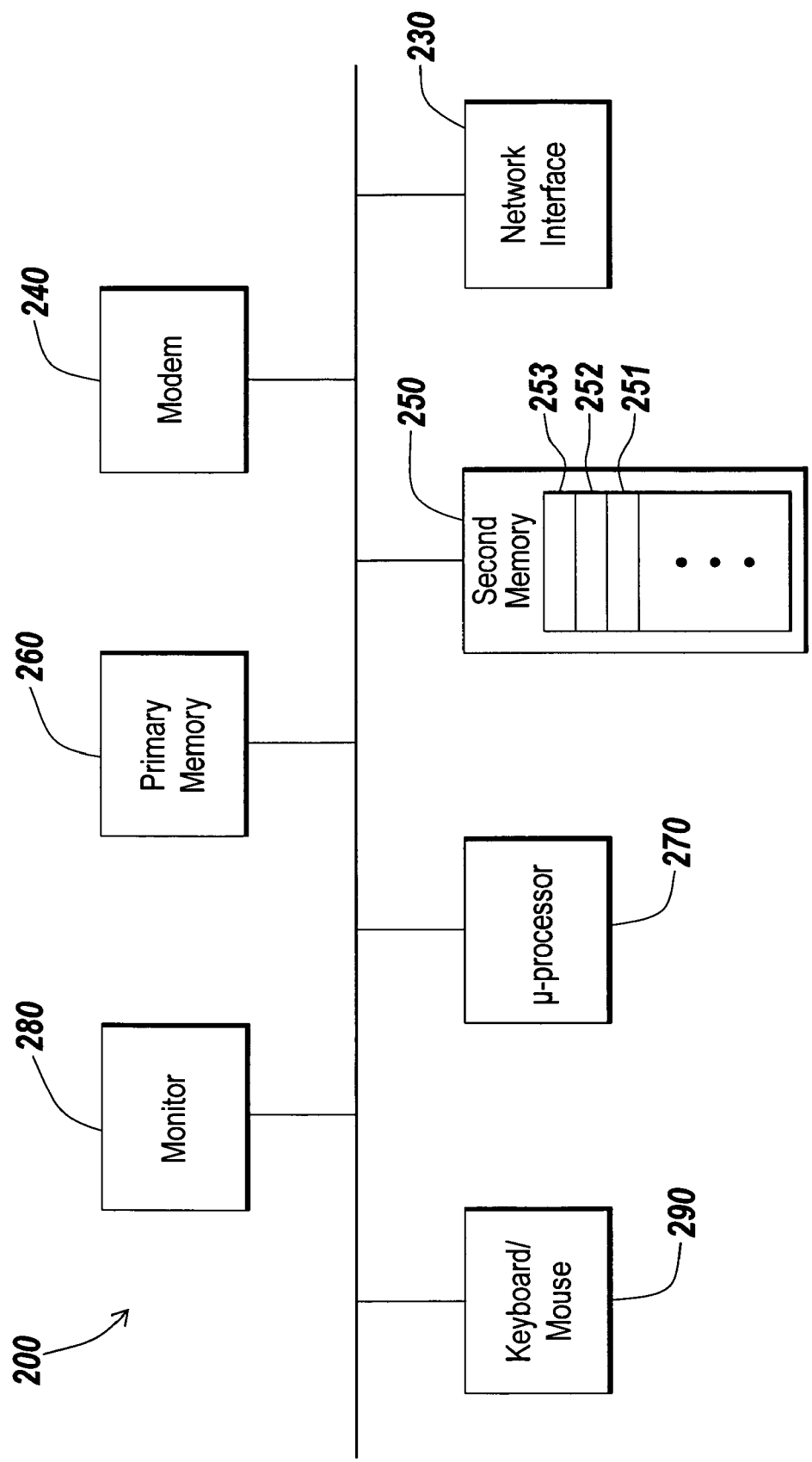
FIG. 2 is an exemplary electronic device suitable for practicing the illustrative embodiment of the present invention depicted in FIG. 1.

FIG. 2 is an exemplary electronic device 200 suitable for practicing the illustrative embodiment of the present invention. The electronic device 200 includes a network interface 230, a MODEM 240, a secondary memory 250, a primary memory 260, a microprocessor 270, a monitor 280 and a keyboard/mouse 290. One of ordinary skill in the art will appreciate that the CAD environment 110 and the block diagram modeling environment 140 may be provided in a same electronic device 200 or in separate electronic devices 200. One of ordinary skill in the art will also appreciate that the CAD environment 110 and the block diagram modeling environment 140 provided in separate electronic devices 220 may be connected through communication networks using the MODEM 240 and network interface 230. The network interface 230 and the MODEM 240 enable the electronic device 200 to communicate with other electronic devices through communication networks, such as Internet, intranet, LAN (Local Area Network), WAN (Wide Area Network) and MAN (Metropolitan Area Network). The communication facilities may support for the distributed implementations of the present invention. The microprocessor 270 controls each component of the electronic device 200 to run software tools for the modeling environments 110 and 140 properly. The electronic device 200 receives the input data necessary for translating a model 120 into a block diagram model 140, such as the input data for setting a translator (see FIG. 3), through the keyboard/mouse 290. The electronic device 200 displays in the monitor 280 the models 120 and/or 140 generated in each of the modeling environments 110 and 140. The primary memory 260 fetches from the secondary memory 250 and provides to the microprocessor 270 the codes that need to be accessed by the microprocessor 270 to operate the electronic device 200 and to run the modeling environments 110 and 140. The secondary memory 250 usually contains software tools for applications. The secondary memory 250 includes, in particular, code 251 for the CAD environment 110, code 252 for the neutral data format 130, and code 230 for the a block diagram modeling environment 140.

Figure 3:
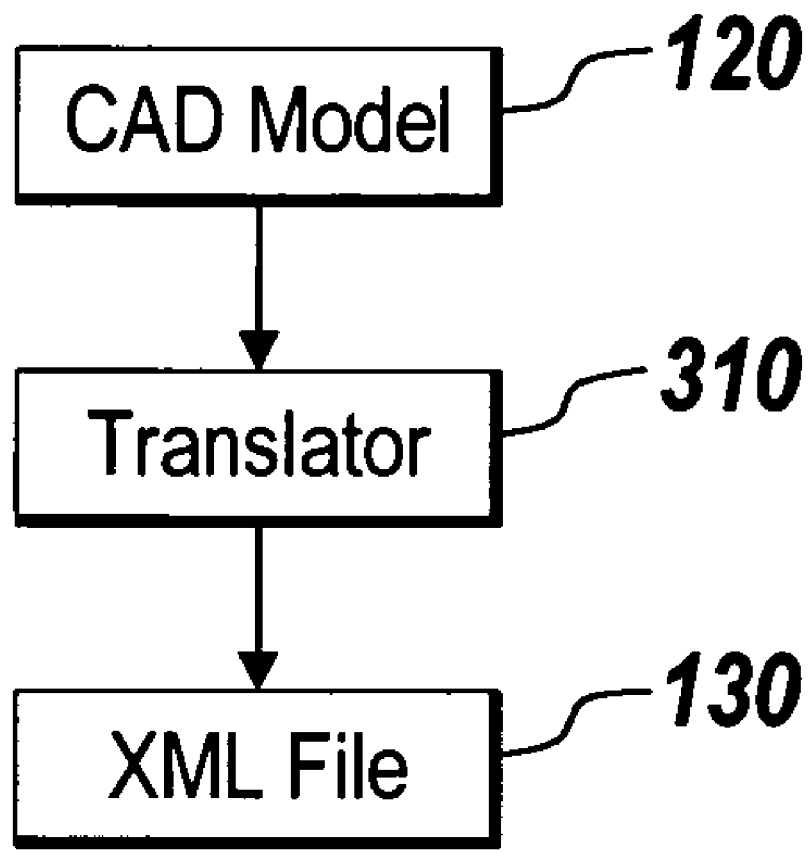
FIG. 3 depicts a translator that translates a CAD model into an XML file in the illustrative embodiment of the present.

FIG. 3 depicts an illustrative embodiment of the present invention in which a translator 310 translates a CAD model 120 into an XML file that serves as the neutral data format 130. The CAD model 120 is exported (i.e. translated) into the XML file 130 by the translator 310. The translator 310 may be integrated with the CAD environment 110 in the illustrative embodiment of the present invention. One of ordinary skill in the art will appreciate that the translator 310 may stand alone in other embodiments of the present invention. One of ordinary skill in the art will also appreciate that the translator 310, alternatively, may be integrated with the block diagram modeling environment 140 that imports the XML file 130.

Figure 4:
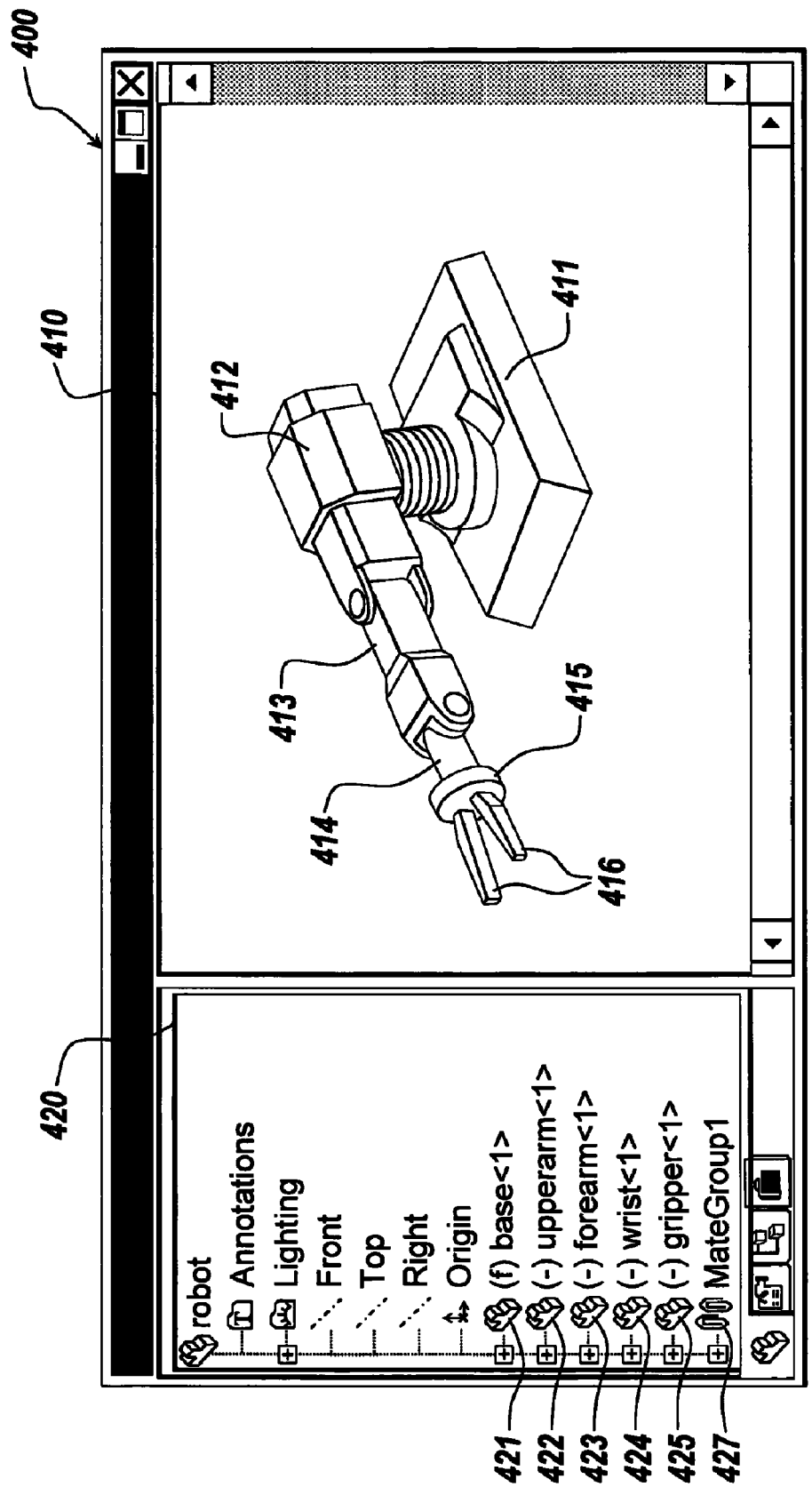
FIG. 4 is an exemplary model window displaying a CAD model for a robot arm in the illustrative embodiment of the present.

An exemplary CAD model for a robot arm is shown in FIG. 4. In this example case, the robot arm model may be created or loaded in a model window 400 that includes two panes: a right pane 410 for displaying three-dimensional geometry of the robot arm and a left pane 420 for displaying information relating to the parts and mates of the robot arm model. The robot arm model includes multiple parts, multiple mates and one subassembly. As shown in the right pane 410, the robot arm model includes four rigid parts: a base 411, an upper arm 412, a forearm 413 and a wrist 414. The robot arm model also includes a subassembly, designated as a gripper 415, that includes two fingers 416. The upper arm 412 can move relative to the base 411 by pitching, yawing and rolling (three DoFs). The forearm 413 can yaw relative to the upper arm 412 (one DoF). The wrist 414 can pitch relative to the forearm 413 (one DoF). The gripper 415 can rotate about its symmetry axis (one DoF). The whole assembly has eight DoFs. The subassembly alone contains two, allowing each finger 416 in the gripper 415 can open and close separately. The main assembly has six DoFs. The hierarchical structure of the robot arm model is displayed on the left pane 420 in which the robot arm model includes a base 421, an upper arm 422, a forearm 423, a wrist 424 and a gripper 425 on the first level of the hierarchical structure.

The robot arm model also includes a group of mates in MateGroup1 427, that includes information on the mates between the parts on the first level. The mate information specifies how parts can move with respect to each other. The mate information may also define the constraints of a part relative to the other part and determines the degrees of freedom (DoFs) of the parts in the model. The gripper subassembly may include its own parts on the second level of the hierarchical structure (not shown in FIG. 4). The gripper subassembly may also include its own group of mates.

Figure 5:
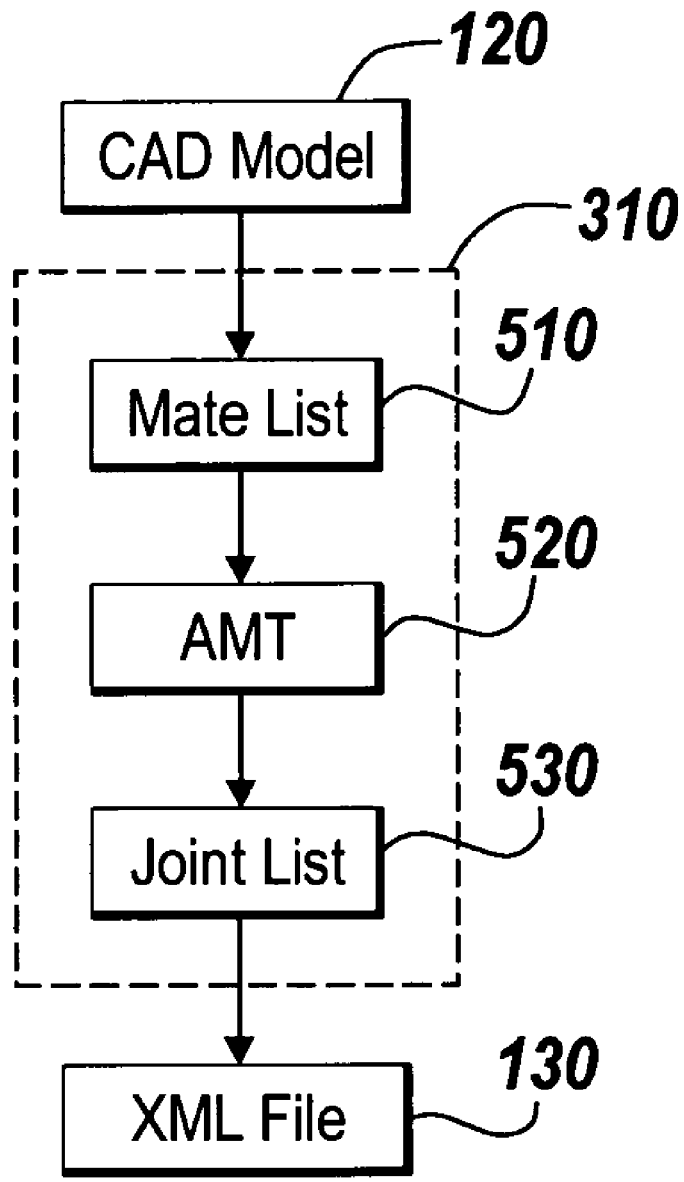
FIG. 5 depicts an exemplary translator shown in FIG. 3 in the illustrative embodiment of the present.

FIG. 5 depicts an exemplary translator 310 shown in FIG. 3. The translator 310 extracts a mate list 510 from the group of mates in the CAD model 120, such as MateGroup1 427. The mate list 510 may include information on each mate in the main assembly and subassemblies of the CAD model 120. Information on the mates describes how the rigid parts of the CAD model 120 mate to each other in the main assembly and the subassemblies of the CAD model 120.

Figure 6A:
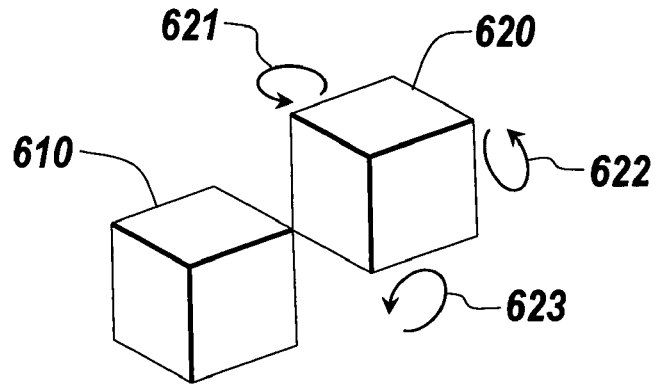
FIGS. 6A-6C illustrate exemplary coincident mates between two cube-shaped parts.
Figure 6B:
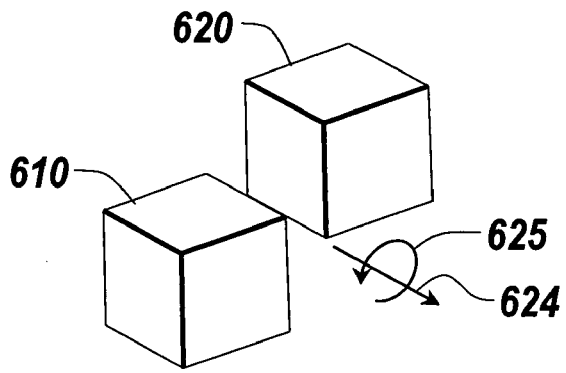
Figure 6C:
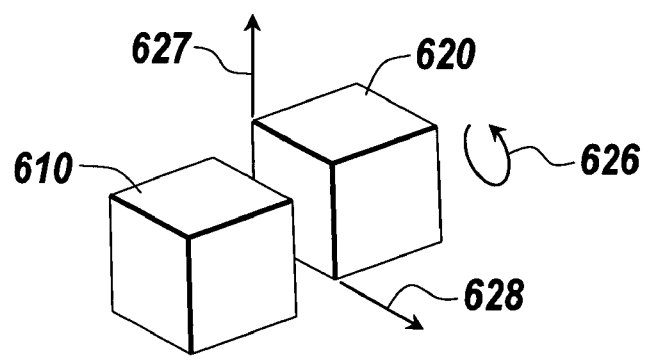

FIGS. 6A-6C illustrate examples of coincident mates between two cube-shaped parts. Mates may be defined between many types of mating parts, including but not limited to vertex points, edge lines, axes, planes and faces. Coincident mates may mate two vertex points, two lines or two planes as shown in FIGS. 6A-6C, respectively. One of skill in the art will appreciate that mates may be defined between different types of mating parts, such as between a point and a line, a point and a plane, a line and a plane, etc. Mates may also be defined between other types of things including but not limited to cylindrical faces and conical faces depending on the CAD environments where the CAD model 120 is created.

FIG. 6A shows two cube-shaped parts 610 and 620 in an assembly in which a coincident mate exists between two corners (vertex points) of the parts. If one of the parts 610 is fixed (anchored in position), the remaining part 620 is free to rotate in any direction, but pivots at the mating point. The mate shown in FIG. 6A leaves three rotational DoFs 621-623 but no translational DoF. FIG. 6B shows a coincident mate that exists between two edge lines of two cube-shaped parts 610 and 620. This coincident mate leaves only the ability to translate along the mating edge line and to rotate about the mating edge line, which means one translational DoF 624 and one rotational DoF 625. FIG. 6C shows a coincident mate that exists between two planes of two cube-shaped parts 610 and 620. The upper part is free to rotate about one axis that is normal to the mating plane, but can slide along the other two axes on the mating plane. The mate shown in FIG. 6C leaves one rotational DoF 626 about the normal axis to the mating plane and two translational DoFs 627 and 628 along two axes on the mating plane. Although single ended arrows are depicted in FIGS. 6A-6C, one of ordinary skill in the art will appreciate that translation and rotations are bidirectional.

The types of mates included in the mate list 510 may differ depending on the CAD environments where the CAD model 120 is created. Different modeling environments may provide different mates. Different mates may affect the main assembly and the subassemblies of the CAD model 120 in different ways. The mates in the mate list 510 may include coincident mates, concentric mates, perpendicular mates, parallel mates, tangent mates, distant mates, angle mates, etc. One of ordinary skill in the art will appreciate that the mates listed above are illustrative and not limiting the scope of the present invention.

Concentric mates may be found typically when cylindrical objects are inserted into holes. Cylindrical, conical and spherical faces can be mated in the concentric mates. The concentric mates allow rigid parts to translate in one direction and rotate about the axis of translation. Tangent mates may occur between parts such as a cylindrical face and a plane, two cylindrical faces, a conical face and a plane, two spherical faces, or a spherical face and a non-planar face. The tangent mates may be used to create a cam mate. Distance mates may leave some distance between two mating parts. Generally the parts that can be mated using coincident mates may also be mated using a distance mate. The difference is that there is some distance between the mating parts. Typically distance mates are applied between two planes or two points. The angle mate may place two planes or two lines (edges) at a specified angle. Angle mates may be used to create hinged assemblies. One of ordinary skill in the art will appreciate that the types of mates mentioned above are illustrative and the mate list 510 may include other types of mates depending on the CAD environments where the CAD model 120 is created.

Figure 7:
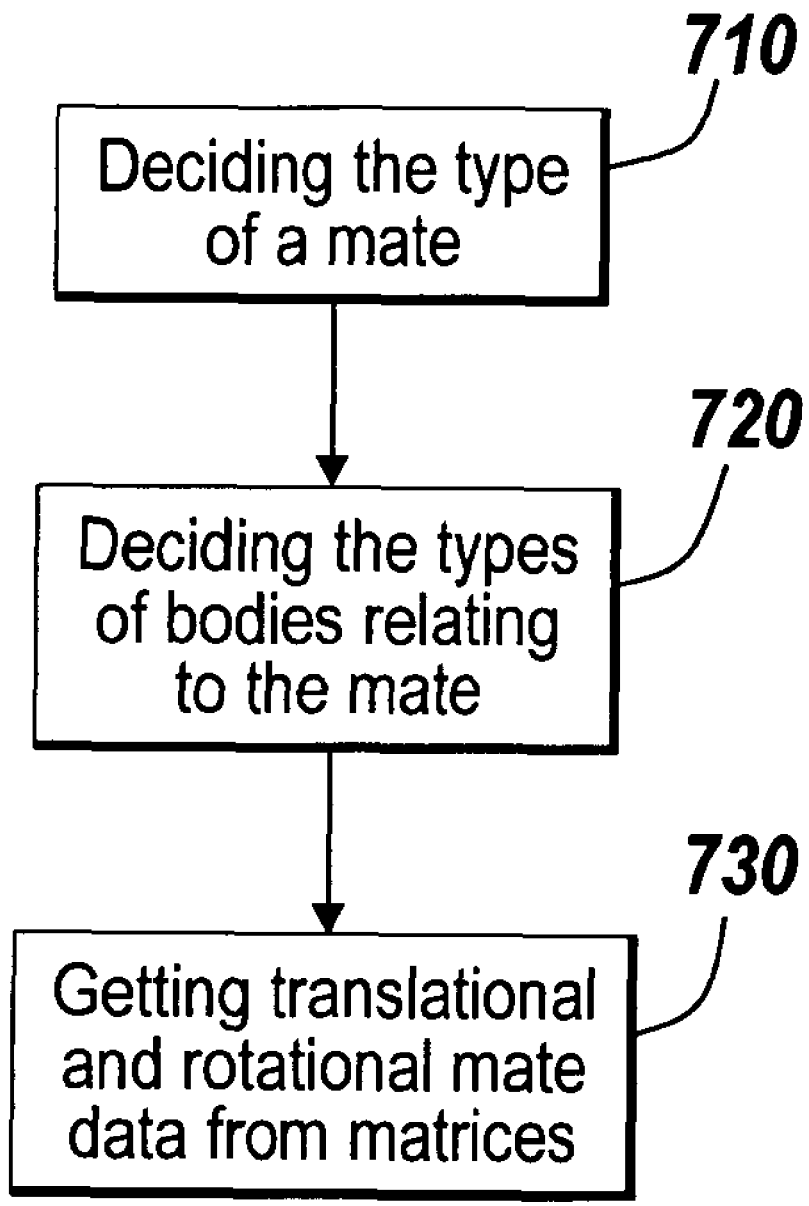
FIG. 7 depicts an illustrative operation of the AMT depicted in FIG. 5 that generates a joint list from a mate list.

The Automatic Mate Translator (AMT) 520 in FIG. 5 translates the mate list 510 into a joint list 530 that includes information for generating corresponding joint blocks in the block diagram modeling environment. Each joint in the joint list 530 includes information on the degrees of freedom between parts in the CAD model 120. FIG. 7 depicts an illustrative operation of the AMT 520 for generating the joint list 530 from the mate list 510. The AMT 520 receives mates from the mate list 510 and decides the types of the mates (step 710). The AMT 520 also decides the types of the mating parts in the CAD model 120 (step 720). With the information of the types of the mates and the mating parts, the AMT 520 finds mate map data in mate map matrices provided in the illustrative embodiment of the present invention (step 730).

Figure 8A:
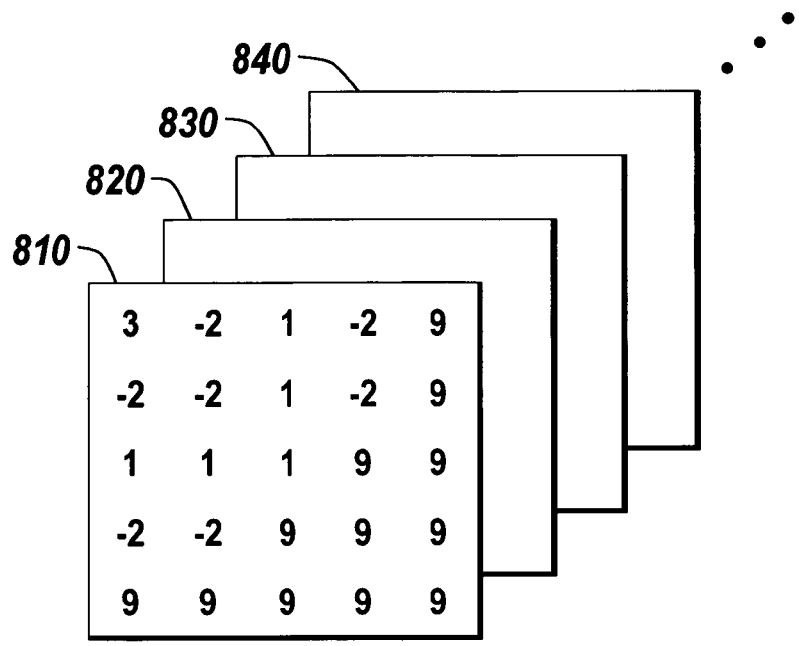
FIGS. 8A and 8B depict illustrative three dimensional mate map matrices for translational and rotational DoFs, respectively.
Figure 8B:
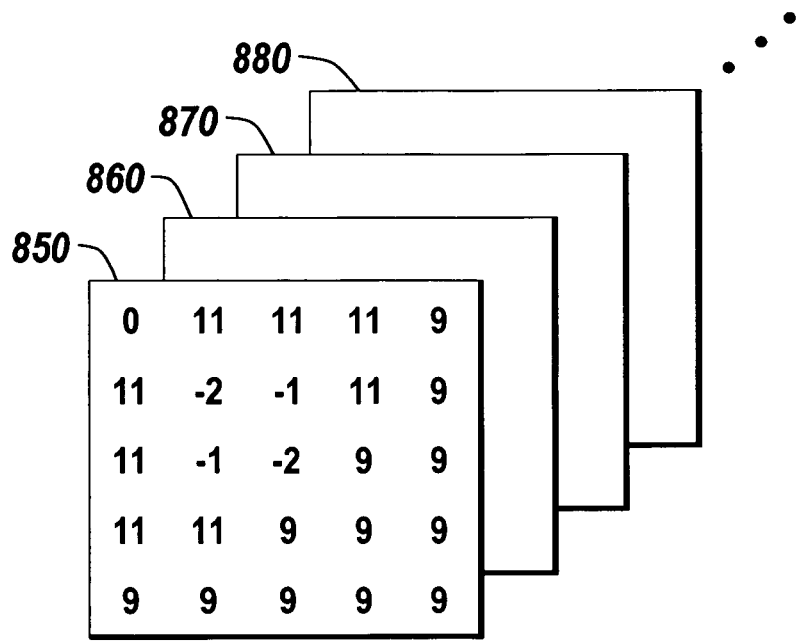

FIGS. 8A and 8B depict illustrative three dimensional mate map matrices for translational and rotational DoFs of the parts, respectively. Each page (or sheet) in FIG. 8A contains translational mate map data for each type of mates. For example, the first page 810 contains translational mate map data for a coincident mate, the second page 820 for a concentric mate, the third page 830 for a perpendicular mate, and the forth page 840 for a parallel mate. In a same manner, each page (or sheet) in FIG. 8B contains rotational mate map data for each type of mates. For example, the first page 850 contains rotational mate map data for a coincident mate, the second page 860 for a concentric mate, the third page 870 for a perpendicular mate, and the forth page 880 for a parallel mate. One of ordinary skill in the art will appreciate that the dimension of the matrices may vary depending on the mates provided in the geometric modeling environments.

FIGS. 9A and 9B illustrate the mate map data contained in the first page of the mate map matrices shown in FIGS. 8A and 8B, respectively. The other pages in the mate map matrices may have the same format as the first page. In the first page, the horizontal (row) and vertical (column) directions represent the types of mating parts in the CAD model 120. The types of the mating parts include a point, a line, a plane, a cylinder and a cone. One of skill in the art will appreciate the types of the mating parts depicted in FIGS. 9A and 9B are illustrative and may differ depending on the CAD environment in which a CAD model is created.

The cross sections of the columns and rows contain mate map data that represents the translational or rotational degrees of freedom (DoFs) lost due to the mate applied to the types of mating parts represented by the crossing row and column. In a translational mate map matrix for a coincident mate shown in FIG. 9A, a point-on-point coincident mate 910, which is described above with reference to FIG. 6A, has mate map data of 3. This means that the point-on-point coincident mate loses three translational DoFs and leaves no translational DoF. In addition, a line-on-line coincident mate 920, which is described above with reference to FIG. 6B, has mate map data of −2, which means that a line-on-line coincident mate loses two translational DoFs and leaves one translational DoF. The minus (−) sign in the mate map data represents that the lost translational DoFs are perpendicular to the mate axis, which is the same as the mating edge line. A plane-on-plane coincident mate 930, which is described above with reference to FIG. 6C, has mate map data of 1. This means that a plane-on-plane mate loses one translational DoF. The plus sign (not shown) in the mate map data means that the lost translation DoF is along the mate axis, which is normal to the mating planes in the example. For cylindrical or conical faces, the mate axis may be the axis passing through the center of the circles of the cylinder or cone. The mate map data of 9 in the mate map matrices represents that the specified mate is not applicable to the corresponding types of mating parts in the CAD model 120. One of ordinary skill in the art will appreciate that the number '9' employed for representing inapplicable types of parts is illustrative and other numbers or symbols may be used for the designation of the inapplicable types of parts.

In a rotational mate map matrix for a coincident mate shown in FIG. 9B, a point-on-point coincident mate 910, which is described above with reference to FIG. 6A, has mate map data of 0. This means that a point-on-point coincident mate does not lose any rotational DoF. In addition, a line-on-line coincident mate 950, which is described above with reference to FIG. 6B, has mate map data of −2. This means that a line-on-line coincident mate loses two rotational DoFs whose axes are perpendicular to the mating axis. As a result, the remaining DoF has a rotation about the mating axis. A plane-on-plane coincident mate 960, which is described above with reference to FIG. 6C, also has mate map data of −2 which means that a plane-on-plane mate loses two rotational DoFs that have rotational axis perpendicular to the mating axis. The remaining DoF has a rotational DoF about the mating axis. The mate map data of 11 represents that the types of parts in the coincident mate are not supported in the illustrative embodiment of the present invention. One of ordinary skill in the art will appreciate that the number '11' employed for representing unsupported types of parts in the mates is illustrative and other numbers or symbols may be used for the designation of the unsupported mates types of parts in the mates.

Illustrative translational mate map data for other mates is provided as follows. One of ordinary skill in the art will appreciate that the mate map data may differ depending on the mates provided in geometric modeling environments.

```
{ {9,     9,    9,   -2,   -2},    // Concentric
  {9,     9,    9,   -2,   -2},
  {9,     9,    2,    9,    9},
  {-2,   -2,    9,   -2,   -2},
  {-2,   -2,    9,   -2,   -2} }, { {9,     9,    9,    9,    9},    // Perpendicular
  {9,     0,    0,    9,    9},
  {9,     0,    0,    9,    9},
  {9,     9,    9,    9,    9},
  {9,     9,    9,    9,    9} }, { {9,     9,    9,    9,    9},    // Parallel
  {9,     0,    0,    9,    9},
  {9,     0,    0,    9,    9},
  {9,     9,    9,    0,    9},
  {9,     9,    9,    9,    0} }, { {9,     9,    9,    9,    9},    // Tangent
  {9,     9,    9,   -1,    9},
  {9,     9,    9,   -2,    9},
  {9,    -1,   -2,   -2,    9},
  {9,     9,    9,    9,    9} }, { {0,     0,    1,    9,    9},    // Distance
  {0,    11,    1,    9,    9},
  {1,     1,    1,    9,    9},
  {9,     9,    9,    9,    9},
  {9,     9,    9,    9,    9} }, { {9,     9,    9,    9,    9},    // Angle
  {9,     0,    9,    9,    9},
  {9,     9,    0,    9,    9},
  {9,     9,    9,    9,    9},
  {9,     9,    9,    9,    9} }
```

Illustrative rotational mate map data for other mates are provided as follows. One of ordinary skill in the art will appreciate that the mate map data may differ depending on the mate provided in geometric modeling environments.

```
{ {9,     9,    9,    0,    0},    // Concentric
  {9,     9,    9,   -2,   -2},
  {9,     9,    2,    9,    9},
  {0,    -2,    9,   -2,   -2},
  {0,    -2,    9,   -2,   -2} }, { {9,     9,    9,    9,    9},    // Perpendicular
  {9,    -1,    2,    9,    9},
  {9,    -2,   -1,    9,    9},
  {9,     9,    9,    9,    9},
  {9,     9,    9,    9,    9} }, { {9,     9,    9,    9,    9},    // Parallel
  {9,    -2,   -1,    9,    9},
  {9,    -1,   -2,    9,    9},
  {9,     9,    9,   -2,    9},
```

-continued

```
   {9,    9,    9,    9,   -2} },
{  {9,    9,    9,    9,    9},    // Tangent
   {9,    9,    9,   11,    9},
   {9,    9,    9,   11,    9},
   {9,   11,   11,   11,    9},
   {9,    9,    9,    9,    9} },
{  {6,   11,    0,    9,    9},    // Distance
   {11,  11,   -1,    9,    9},
   {0,   -1,   -2,    9,    9},
   {9,    9,    9,    9,    9},
   {9,    9,    9,    9,    9} },
{  {9,    9,    9,    9,    9},    // Angle
   {9,    1,    9,    9,    9},
   {9,    9,   -2,    9,    9},
   {9,    9,    9,    9,    9},
   {9,    9,    9,    9,    9} }
```

Figure 10:
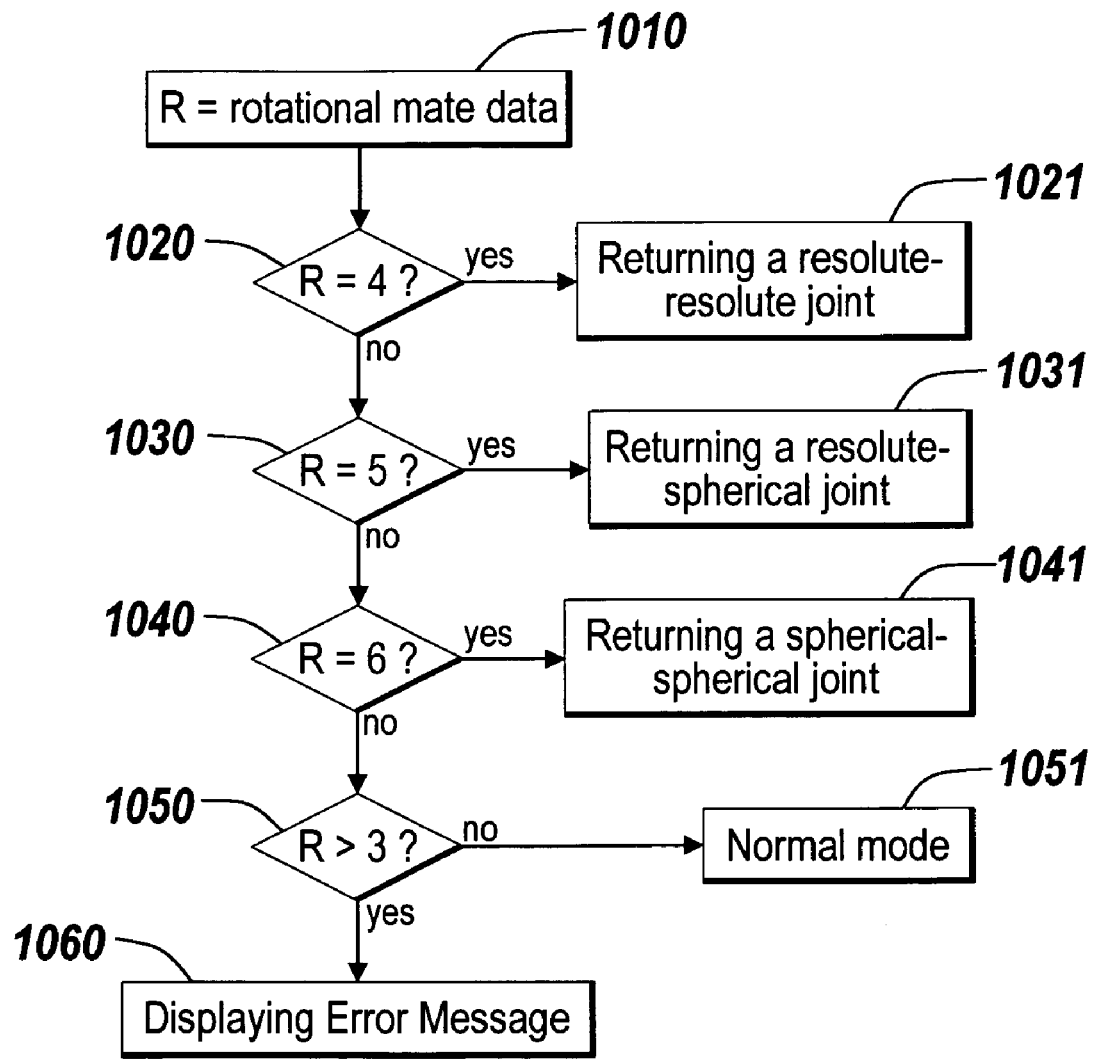
FIG. 10 illustrates the operation of the AMT depicted in FIG. 5 that generates the joint list based on mate map data.

FIG. 10 illustrates the operation of the AMT 520 that generates joint list 530 based on the mate map data. The AMT 520 determines whether the mate map data represents a special joint based on the rotational mate map data (step 1010). If the rotational mate map data is 4 (step 1020), the AMT 520 returns a revolute-revolute joint in the joint list 530 (step 1021). A revolute-revolute joint represents a composite joint composed of two revolute joint spatially separated by a massless connector of constant length. If the rotational mate map data is 5 (step 1030), the AMT 520 returns a revolute-spherical joint in the joint list 530 (step 1031). A revolute-spherical joint represents a composite joint composed of a revolute and a spherical joint spatially separated by a massless connector of constant length. If the rotational mate map data is 6 (step 1040), the AMT 520 returns a spherical-spherical joint in the joint list 530 (step 1041). The spherical-spherical joint represents a composite joint composed of two spherical joint spatially separated by a massless connector of constant length. One of ordinary skill in the art will appreciate that the numbers employed for the comparison of special joints are illustrative and other numbers or symbols may be used for designating the special joints in the mate map matrices. If the rotational mate map data is 9 or 11 (step 1050), the translator 310 displays an error message that the part types are not applicable or supported (step 1060). If the rotational mate map data is not greater than 3 (step 1050), the AMT 520 performs a normal mode (1051), which will be described below in more detail with reference to FIG. 11.

Figure 11A:
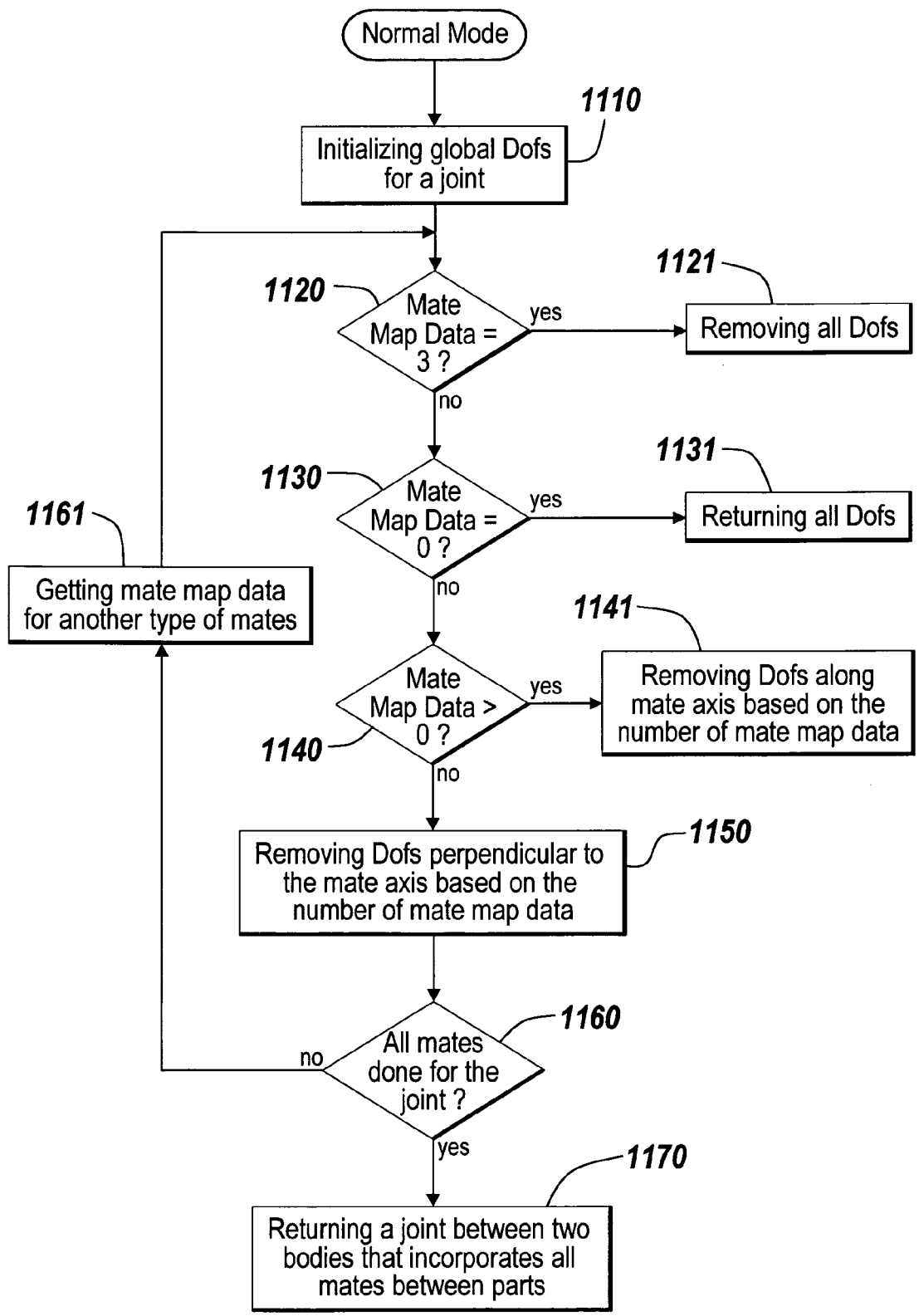
FIG. 11A depicts an illustrative operation of the normal mode depicted in FIG. 10.

FIG. 11A depicts an illustrative operation of the normal mode depicted in FIG. 10. The AMT 520 initializes a global DoF for a joint between bodies that represent rigid parts in the CAD model 120 (step 1110). The global DoF may have six DoFs of relative movement of a body with regard to the other body coupled to the joint. If each part in the CAD model is not fixed, the part can translate in the x, y and z directions (3 translational DoFs), and also rotate about the x, y and z axis (3 rotational DoFs). The mates may restrict the directions that the part can translates and/or rotate. The AMT 520 determines whether the translational or rotational mate map data is 3 (step 1120). If so, the AMT 520 removes all of the translational or rotational DoFs from the global DoFs for the joint (step 1121). If the translational or rotational mate map data is zero (step 1130), the AMT 520 does not remove any DoF and returns the state of the translational or rotational DoFs unchanged (step 1131). If the mate map data is grater than zero (step 1140), that is, the mate map data is a positive, the AMT 520 removes DoFs that are along the mate axis from the global DoFs for the joint (step 1141). For example, if the mate map data is 1, as described above with reference to FIG. 9A, the AMT 520 removes a DoF that exists along the mate axis from the global DoFs for the joint. If the mate map data is less than zero (step 1140), the AMT 520 removes DoFs that are perpendicular to the mate axis from the global DoFs for the joint (step 1150). The number of the DoFs removed from the global DoFs is determined based on the mate map data. The steps 1120 through 1150 are repeated for the all mates between two parts in the CAD model 120 (step 1161). If all of the mates between two parts are examined (step 1160), the AMT 520 returns remaining DoFs in the global DoFs for the joint. The remaining DoFs incorporate all of the mates between the two parts in the CAD model 120.

Figure 11B:
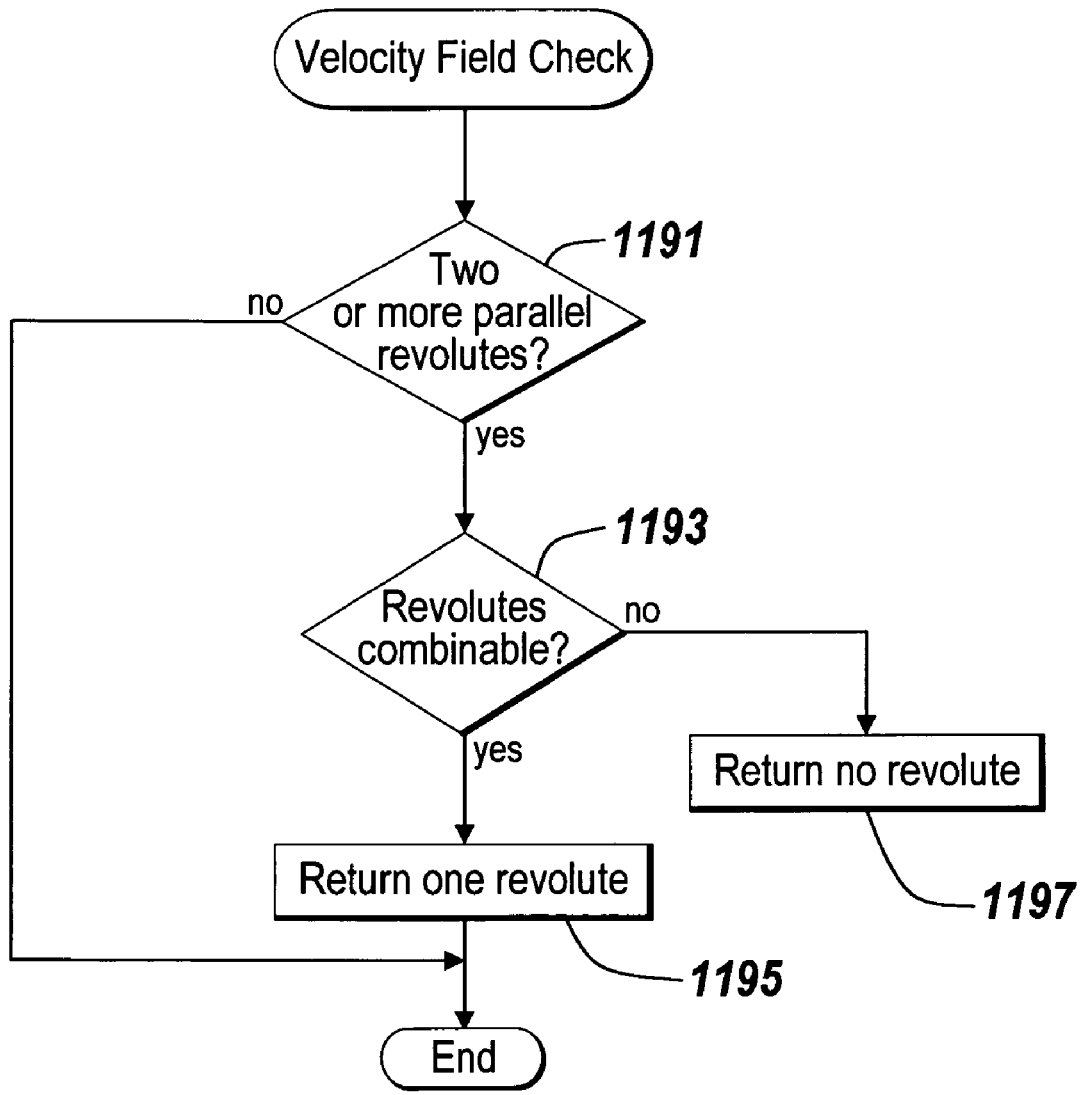
FIG. 11B depicts an illustrative operation for a velocity field check performed by the AMT.

FIG. 11B depicts an illustrative operation for a velocity field check performed by the AMT 520. The velocity field check is conducted when the global DoFs are initialized using the first mate and when every mate is processed afterwards. A revolute joint generates a velocity field for a moving body. The velocity field is a circle of tangent velocities perpendicular to the revolute axis. The AMT 520 determines if there are two or more revolutes that are parallel but separate by a finite distance for each of the mates (step 1191). If not, the velocity field check ends. If there are two or more parallel and separate revolutes, the AMT 520 determines if the revolutes are combinable based on the velocity fields of the revolutes (step 1193). For the revolutes to be combined, one of the revolute should allow the velocity fields of the other revolutes. Additionally, one or more of the revolutes should be movable to be combined. This means that there are two prismatic DoFs perpendicular to the revolute axis. If the revolutes are combinable, the AMT 520 returns one combined revolute (step 1195). If the revolutes are not combinable, the AMT 520 kills the revolutes and does not return any revolute for the mate (step 1197).

The translator 310 exports the joint list 530 into the XML file 130 that serves as a neural data format. The joint list 530 generated from the CAD model 120 is stored in the XML file 130. One of ordinary skill in the art will appreciate that the extracted information may be stored in multiple XML files. One of ordinary skill in the art will also appreciate that the extracted information need not be stored at the same location.

FIG. 12 shows an exemplary portion of an XML file 130 for the robot arm example depicted in FIG. 4. The XML file 130 may include a top level object 1210 defining an XML file 130 that contains one physical model. The top level object 1210 may also include information on a format version, a creation date and a model name. The XML file 130 includes a top level subsystem 1220 for the model that corresponds to the main assembly of the robot arm model. The subsystem 1220 may include elements, such as <bodies> 1230, <joints> 1240, <grounds> 1250 and <subsystems> 1260.

The <joints> element 1240 contains information exported from the joint list 530. The information contained in the <joints> element 1240 includes information on the DoFs of parts in the robot arm model and is used to build joint blocks in a block diagram modeling environment 140, which will be described in more detail below with reference to FIG. 13. The <joints> element 1240 includes multiple <SimpleJoint> elements 1241 each of which may incorporate information for a primitive or composite joint between two parts in the robot arm model. The composite joint may include multiple primitives for a joint. The multiple mates between two parts may be incorporated into one joint block in the block diagram modeling environment 140. A portion of an exemplary XML file 130 for a <SimpleJoint> element 1241 in the <joints> element 1230 is provided as follows.

```
<SimpleJoint>
    <name>"upperarm-1—forearm-1"</name>
    <status>""</status>
    <base>
        <JointSide>
            <name>""</name>
            <connection>
                <Frame ref="13"/>
            </connection>
        </JointSide>
    </base>
    <follower>
        <JointSide>
            <name>""</name>
            <connection>
                <Frame ref="15"/>
            </connection>
        </JointSide>
    </follower>
    <primitives>
        <Primitive>
            <name> "revolute"</name>
            <referenceFrame> "WORLD"</referenceFrame>
            <axis>0,1,0</axis>
        </Primitive>
    </primitives>
<SimpleJoint>
```

The <SimpleJoint> element 1241 shown above includes information relating to the DoFs of the joint between the upper arm 412 (base) and forearm 413 (follower) of the robot arm model. The <SimpleJoint> element 1241 includes primitives of a joint, which represent the DoFs of the joint. The examples of the primitives may include a prismatic joint, a revolute joint, a spherical joint, weld, etc. The primitive joint expresses one degree of freedom (DoF) or coordinate of motion if the DoF is a translation along one direction (prismatic joint) or a rotation about one fixed axis (revolute joint). The spherical joint, which has three DoFs including two rotations to specify directional axis and one rotation about that axis, may be treated as a primitive in the illustrative embodiment of the present. A weld has no degree of freedom. Composite joints can be built up from these primitive joints. As described above with reference to FIG. 4, the forearm 413 has a rotational DoF relative to the upper arm 412. The mates between the forearm 413 and the upper arm 412 are translated into information representing one rotational DoF by the AMT 520 through the process described above with referenced to FIGS. 5-11. As a result, the exemplary XML file 130 shown above contains information on a rotational DoF represented by a Revolute primitive having a rotation axis at [0 1 0].

Figure 13:
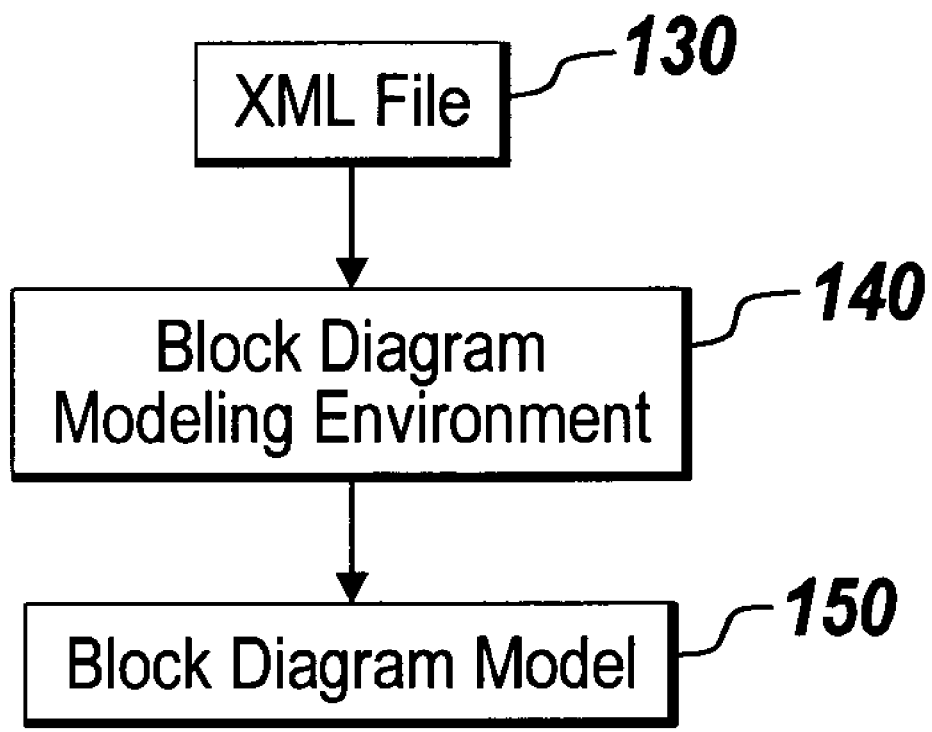
FIG. 13 depicts an illustrative embodiment of the present invention in which a block diagram modeling environment imports an XML file and builds a block diagram model from the XML file.

FIG. 13 depicts an illustrative embodiment of the present invention in which a block diagram modeling environment 140 builds up a block diagram model 150 from the XML file 130. In the block diagram modeling environment 140, users may input a command, such as a MATLAB® command import_physmod ('XML file name'), to import an XML file 130 and build a model. If the users input a command to import an XML file 130, the block diagram modeling environment 140 reads the XML file 130 into the block diagram modeling environment 140. The block diagram modeling environment 140 parses the XML file 130 and determines corresponding blocks based on the information contained in the XML file 130. Joint blocks may be created based on the DoFs information contained in the <joints> 1240 field of the XML file 130. A single joint block may be created that incorporates all of the DoFs with respect to the mates between two rigid parts in the CAD model. One of skill in the art will appreciate that multiple joint blocks may be created with respect to the mates between two rigid parts in the CAD model. The joint blocks may represent primitive joints or composite joints. A primitive joint expresses one DoF or coordinate of motion and may include a prismatic joint for translational movement or a revolute joint for rotational movement. The primitive joint may include a spherical joint that represent three rotational DoFs in angle-axis form. Composite joints are compounded from more than one primitive joint and represent more than one DoF.

One of skill in the art will appreciate that joint blocks are illustrative elements that represent DoFs of bodies in the block diagram modeling environment. The DoFs of bodies may be represented by other types of elements in the block diagram modeling environment, such as Constraint blocks provided in SimMechanics. The Constraint blocks restrict relative DoFs between a pair of bodies. The Constraint blocks may restrict velocities and accelerations as well as positions of the bodies. SimMechanics provides exemplary Constraint blocks including a Parallel Constraint block and a Point-Curve Constraint block. The bodies connected by the Parallel Constraint block are restricted in their relative rotational motion. The bodies connected by the Point-Curve Constraint block can only move relative to one another if a point on one body moves along a curve on the other body. One of skill in the art will appreciate that the Parallel Constraint block and Point-Curve Constraint block are illustrative and any other kinds of Constraint blocks may be provided in the block diagram modeling environment. The mates between rigid parts in the CAD model that can be represented as Joint blocks may be represented as the Constraint blocks in the block diagram modeling environment. Furthermore, the mates between rigid parts in the CAD model that cannot be represented as joint blocks may be represented as a single or multiple Constraint blocks if the corresponding Constraint blocks are provided in the block diagram modeling environment.

In summary, the illustrative embodiment of the present invention translates mate information between parts of a CAD model 120 into information representing degrees of freedom (DoFs) of the parts. In translating mate information into DoFs information, the illustrative embodiment of the present invention utilizes mate map data that represents DoFs lost due to the mates between the parts of the CAD model 120. The information on the DoFs of the parts is stored in an XML file 130. One of ordinary skill in the art will appreciate that the CAD model 120 is an illustrative model and mate information of any other models may be translated into DoFs information. One of ordinary skill in the art will also appreciate that the XML file 130 is an illustrative neutral data format and any other markup language format may be used in other embodiments. The DoFs information in the XML file 130 is imported into a block diagram modeling environment 140 in which a corresponding joint block is built up using the DoFs information contained in the XML file 130. The joint blocks are used to generate a block diagram model 150 for the CAD model 120. The block diagram model 150 may be used for the dynamic simulation of the CAD model 120. The block diagram model may also used for designing the control system of the CAD model 120.

It will thus be seen that the invention attains the objectives stated in the previous description. Since geometric changes may be made without departing from the scope of the present invention, it is intended that all matter contained in the above description or shown in the accompanying drawings be interpreted as illustrative and not in a literal sense. For example, the illustrative embodiment of the present invention may be practiced with any geometric model that provides mate information for mating components of the model. Practitioners of the art will realize that the sequence of steps and architectures depicted in the figures may be altered without departing from the scope of the present invention and that the illustrations contained herein are singular examples of a multitude of possible depictions of the present invention.

We claim:

1. One or more computer-readable media comprising computer-executable instructions for execution on a processor, the instructions including:
   one or more instructions for providing a matrix including mapping data that represent one or more lost degrees of freedom for one or more mates between two or more parts represented in a model in a modeling environment, the lost degrees of freedom representing degrees of freedom lost due to the mates between the parts, a first dimension of the matrix representing one or more types of a first part relating to a mate with a second part, a second dimension of the matrix representing one or more types of the second part;
   one or more instructions for initializing one or more global degrees of freedom for the mates, the global degrees of freedom including one or more degrees of freedom;
   one or more instructions for removing at least one degree of freedom from the global degrees of freedom based on the mapping data; and
   one or more instructions for storing the global degrees of freedom after the at least one degree of freedom is removed.

2. The computer-readable media of claim 1 further including:
   one or more instructions for removing at least one degree of freedom, that is perpendicular to a mate axis associated with a mate, from the global degrees of freedom if the mapping data represents one or more degrees of freedom lost perpendicular to the mate axis.

3. The computer-readable media of claim 1 further including:
   one or more instructions for removing at least one degree of freedom, that is along a mate axis associated with a mate, from the global degrees of freedom if the mapping data represents one or more degrees of freedom lost along the mate axis.

4. The computer-readable media of claim 1 wherein the global degrees of freedom are stored in a markup language format.

5. The computer-readable media of claim 1 wherein the model is a geometric model and the modeling environment is a geometric modeling environment.

6. The computer-readable media of claim 5 further including:
   one or more instructions for importing the stored global degrees of freedom into a block diagram modeling environment; and
   one or more instructions for generating a block diagram model in the block diagram modeling environment based on the stored global degrees of freedom.

7. The computer-readable media of claim 1 wherein the geometric model includes two or more revolutes that are parallel and separate by a finite distance from one or more mates and the two or more revolutes are associated with one or more velocity fields, the media further including:
   one or more instructions for identifying the two or more revolutes;
   one or more instructions for determining if the two or more revolutes are combinable based on the one or more velocity fields; and
   one or more instructions for combining the two or more revolutes if the two or more revolutes are determined to be combinable.

8. The computer-readable media of claim 7 wherein a velocity field associated with a revolute is a circle of tangent velocities perpendicular to an axis of the revolute.

9. A computer-implemented method comprising:
   Providing a matrix including mapping data that represent one or more lost degrees of freedom for one or more mates between two or more parts represented in a model in a modeling environment, the lost degrees of freedom representing degrees of freedom lost due to the mates between the parts, a first dimension of the matrix representing one or more types of a first part relating to a mate with a second part, a second dimension of the matrix representing one or more types of the second part;
   initializing one or more global degrees of freedom for the mates, the global degrees of freedom including one or more degrees of freedom;
   removing at least one degree of freedom from the global degrees of freedom based on the mapping data; and
   storing the global degrees of freedom after the at least one degree of freedom is removed.

10. The computer-implemented method of claim 9 wherein removing further comprises:
    removing at least one degree of freedom, that is perpendicular to a mate axis associated with a mate, from the global degrees of freedom if the mapping data represents one or more degrees of freedom lost perpendicular to the mate axis.

11. The computer-implemented method of claim 9 wherein removing further comprises:
    removing at least one degree of freedom, that is along a mate axis associated with a mate, from the global degrees of freedom if the mapping data represents one or more degrees of freedom lost along the mate axis.

12. The computer-implemented method of claim 9 wherein the global degrees of freedom are stored in a markup language format.

13. The computer-implemented method of claim 9 wherein the model is a geometric model and the modeling environment is a geometric modeling environment.

14. The computer-implemented method of claim 13 further comprising:
    importing the stored global degrees of freedom into a block diagram modeling environment; and
    generating a block diagram model in the block diagram modeling environment based on the stored global degrees of freedom.

15. The computer-implemented method of claim 9 wherein the geometric model includes two or more revolutes that are parallel and separate by a finite distance from one or more mates and the two or more revolutes are associated with one or more velocity fields, the method further including:
    identifying the two or more revolutes;
    determining if the two or more revolutes are combinable based on the one or more velocity fields; and
    combining the two or more revolutes if the two or more revolutes are determined to be combinable.

16. The computer-implemented method of claim 15 wherein a velocity field associated with a revolute is a circle of tangent velocities perpendicular to an axis of the revolute.

17. A system comprising:
a memory;
a processor configured to:
provide a matrix including mapping data that represent one or more lost degrees of freedom for one or more mates between two or more parts represented in a model in a modeling environment, the lost degrees of freedom representing degrees of freedom lost due to the mates between the parts, a first dimension of the matrix representing one or more types of a first part relating to a mate with a second part, a second dimension of the matrix representing one or more types of the second part;
initialize one or more global degrees of freedom for the mates, the global degrees of freedom including one or more degrees of freedom;
remove at least one degree of freedom from the global degrees of freedom based on the mapping data; and
store the global degrees of freedom in the memory after the at least one degree of freedom is removed.

18. An apparatus comprising:
means for providing a matrix including mapping data that represent one or more lost degrees of freedom for one or more mates between two or more parts represented in a model in a modeling environment, the lost degrees of freedom representing degrees of freedom lost due to the mates between the parts, a first dimension of the matrix representing one or more types of a first part relating to a mate with a second part, a second dimension of the matrix representing one or more types of the second part;
means for initializing one or more global degrees of freedom for the mates, the global degrees of freedom including one or more degrees of freedom;
means for removing at least one degree of freedom from the global degrees of freedom based on the mapping data; and
means for storing the global degrees of freedom after the at least one degree of freedom is removed.

* * * * *

UNITED STATES PATENT AND TRADEMARK OFFICE
CERTIFICATE OF CORRECTION

| | | |
|---|---|---|
| PATENT NO. | : 7,945,431 B1 | |
| APPLICATION NO. | : 12/008586 | |
| DATED | : May 17, 2011 | |
| INVENTOR(S) | : Arnav Mukherjee et al. | |

It is certified that error appears in the above-identified patent and that said Letters Patent is hereby corrected as shown below:

At column 3, line 51 of the printed patent, please change "Tex" to --Texas--.

At column 16, line 16 of the printed patent, please change "Providing" to --providing--.

Signed and Sealed this
Ninth Day of August, 2011

David J. Kappos
*Director of the United States Patent and Trademark Office*